United States Patent
Vo et al.

(10) Patent No.: US 10,480,613 B2
(45) Date of Patent: Nov. 19, 2019

(54) METAL ISOLATOR WITH TUNABLE RESONANT FREQUENCIES

(71) Applicant: Raytheon Company, Waltham, MA (US)

(72) Inventors: Peter H. Vo, Oro Valley, AZ (US); Colleen Williams, Tucson, AZ (US); Brandon Craig Barclay, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/951,104

(22) Filed: Apr. 11, 2018

(65) Prior Publication Data

US 2019/0316652 A1  Oct. 17, 2019

(51) Int. Cl.
*F16F 15/08* (2006.01)
*B29C 70/68* (2006.01)
(Continued)

(52) U.S. Cl.
CPC ............ *F16F 15/085* (2013.01); *B21D 22/02* (2013.01); *B29C 70/68* (2013.01); *F16F 1/18* (2013.01);
(Continued)

(58) Field of Classification Search
CPC .......... F16F 15/085; F16F 15/073; F16F 1/18; F16F 3/12; F16F 2224/0208;
(Continued)

(56) References Cited

U.S. PATENT DOCUMENTS

| 2,932,546 A | 4/1960 | Marggraf et al. |
| 4,656,383 A * | 4/1987 | Albert .................... G01L 1/162 310/312 |

(Continued)

FOREIGN PATENT DOCUMENTS

| EP | 0614513 B1 | 3/1997 |
| EP | 2682655 A2 | 1/2014 |
| WO | WO 2014111534 A1 | 7/2014 |

OTHER PUBLICATIONS

International Search Report for International Application No. PCT/US2019/017353 dated May 17, 2019, 18 pages.

*Primary Examiner* — Anita M King (57) ABSTRACT

An isolator device comprises a first mount coupleable to an input structure subject to shock and/or vibration energy, a second mount coupleable to an object to be isolated (e.g., an electronics device). A flexure structure is coupled between the first and second mounts, and comprises a plurality of parallel flexures, a series of flexures, and a plurality of transition portions, all defining an isolation path between the first and second mounts. The parallel flexures are tuned to resonant frequency to attenuate shock and/or vibration in an axial direction relative to a normal axis. The series of radial flexures are tuned to resonant frequencies to attenuate shock and/or vibration energy in both radial directions relative to the normal axis. The isolator device can be a single piece of metallic material. An elastomeric damping material can be disposed within openings defined by the flexure structure to dampen response at the isolator's resonant frequency. Associated systems and methods are provided.

28 Claims, 7 Drawing Sheets

(51) Int. Cl.
  *B21D 22/02* (2006.01)
  *F16F 3/12* (2006.01)
  *F16F 1/18* (2006.01)
  *F16F 15/073* (2006.01)
  *B29L 31/00* (2006.01)
  *B29K 705/00* (2006.01)

(52) U.S. Cl.
  CPC .............. *F16F 3/12* (2013.01); *F16F 15/073* (2013.01); *B29K 2705/00* (2013.01); *B29L 2031/721* (2013.01); *F16F 2224/025* (2013.01); *F16F 2224/0208* (2013.01); *F16F 2226/04* (2013.01)

(58) Field of Classification Search
  CPC ............ F16F 2224/025; F16F 2226/04; B21D 22/02; B29C 70/68; B29K 2705/02; B29L 2031/721
  See application file for complete search history.

(56) References Cited

U.S. PATENT DOCUMENTS

| | | | |
|---|---|---|---|
| 5,267,720 A * | 12/1993 | Brazell | F16F 15/02 248/618 |
| 5,310,157 A | 5/1994 | Platus | |
| 5,971,375 A | 10/1999 | Simonian et al. | |
| 8,262,051 B2 | 9/2012 | Vo et al. | |
| 2014/0008557 A1* | 1/2014 | Vandamme | F16F 1/027 251/129.15 |
| 2016/0131216 A1 | 5/2016 | Miyazaki | |
| 2016/0146282 A1* | 5/2016 | Collard | F16F 3/12 267/140.4 |

* cited by examiner

METAL ISOLATOR WITH TUNABLE RESONANT FREQUENCIES

GOVERNMENT LICENSE RIGHTS

This invention was made with government support under contract number N00024-15-C-5420 awarded by the U.S. Navy. The government has certain rights in the invention.

BACKGROUND

In many applications, it is vital to isolate shock and/or vibration energy forces between a structure that exhibits or generates shock and/or vibration energy, and an object or device to be isolated from such shock and/or vibration energy. In sensitive electronics applications, if shock and/or vibration energy is not appropriately attenuated, the sensitive electronics are prone to damage or faulty sensor readings.

For example, in missile seeker applications, sensors mounted at the end of the missile are typically stabilized by one or more dynamically tuned gyroscopes (e.g., two-axis gyros). However, at high amplitude shock or vibration inputs, such gyroscopes are prone to catastrophic failure of the gyroscopes mechanical rotor suspension, which causes faulty readings or damage to the sensors of the missile seeker, thereby causing the missile seeker systems to fail.

A typical device utilized to attenuate shock and/or vibration energy is an isolator. Isolators are commonly comprised of an elastomeric material (e.g., a rubber sheet or ring) that isolate sensitive electronic equipment from the vibration input source (e.g., a missile body). One problem with elastomeric materials used as isolators is that their mechanical properties (i.e., elasticity, resiliency, creep, etc.) tend to change over time during use, which can cause misalignments and ineffectiveness of shock and/or vibration energy isolation.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure sets forth an isolator device comprising a first mount coupleable to an input structure subject to at least one of shock or vibration energy, a second mount coupleable to an object to be isolated. The first and second mounts define a normal axis (x-axis) of the isolator device. A flexure structure is coupled between the first and second mounts, and comprises at least one radial flexure defining an isolation path between the first and second mounts. The at least one radial flexure comprises a plurality of transition portions, and the at least one radial flexure is tuned to a predetermined radial resonant frequency. The at least one radial flexure structure can be operable to attenuate at least one of shock or vibration energy transferrable from the input structure in at least one radial direction relative to the normal axis.

In some examples, the flexure structure further comprises a series of radial flexures coupled to one another via transition portions, and the series of radial flexures can at least partially define the isolation path.

In some examples, the flexure structure is comprised of a metallic material, and may be formed from a single piece of metallic material.

In some examples, the flexure structure further comprises a plurality of parallel flexures coupled between the first mount and the at least one radial flexure, and are operable to attenuate at least one of shock or vibration energy in a direction parallel to the normal axis.

In some examples, the at least one radial flexure at least partially defines a plurality of openings positioned between the first and second mounts.

In some examples, the isolator device further comprises an elastomeric damping material disposed within the plurality of openings, and is operable to further attenuate the at least one vibration or shock energy, such as to dampen response at the isolator's resonant frequency.

The present disclosure also sets forth a system for isolating a device from a support structure comprising an input structure subjectable to at least one of shock or vibration energy, and an object to be isolated from the shock or vibration energy from the input structure. The system comprises an isolator device isolating the object from the input structure. The isolator device can comprise a first mount coupled to the input structure, and a second mount coupled to the object (the first and second mounts define a normal axis of the isolator device). The isolator device can comprise a flexure structure coupled between the first and second mounts, comprising at least one radial flexure defining an isolation path between the first and second mounts. The at least one radial flexure comprises a plurality of transition portions, and is tuned to a predetermined radial resonant frequency. The radial flexure structure is operable to attenuate the shock or vibration energy transferrable from the input structure in at least one radial direction relative to the normal axis.

The present disclosure further sets forth a method for making an isolator device tuned to a predetermined resonant frequency to isolate an object from an input structure. The method comprises determining a resonant frequency associated with an object to be isolated from at least one of shock or vibration energy from an input structure by an isolator device. The method comprises selecting a metallic material that forms the isolator device based on the determined resonant frequency. The method comprises forming a first mount coupleable to the input structure, and forming a second mount coupleable to the object, where the first and second mounts form a portion of the isolator device. The method comprises forming at least one radial flexure of a flexure structure of the isolator device between the first and second mounts to form the isolator device. The radial flexure is operable to attenuate the shock or vibration energy transferrable from the input structure.

In some examples, the method comprises selecting a volume and type of elastomeric damping material based on the determined resonant frequency, and depositing the selected elastomeric damping material about or within a plurality of openings or slots or channels defined by the at least one radial flexure.

In some examples, the method comprises forming the flexure structure by forming a plurality of radial flexures having a plurality of transition portions, and by forming a plurality of parallel flexures between the plurality of radial flexures and the first mount, whereby the plurality of radial flexures and the plurality of parallel flexures are collectively operable to attenuate at least one of shock or vibration energy in three axes relative to a normal axis.

As is known, shock and/or vibration energy attenuation is proportional with its travel distance (the longer the travel distance, the smaller the shock amplitude becomes). Shock and/or vibration energy is also attenuated if its travel path deviates from a previous direction, such as from a straight line (e.g., a curve or bend, such as through some type of transition portion traveling a path direction different from a previous direction). The examples discussed herein apply these two principals of isolator device(s) having radial flexures and transition portions that define a circuitous isolation path. These radial flexures and transition portions lengthen the travel distance and also change (e.g., bend) shock and/or vibration energy travel paths. In some examples, this is done using multiple ninety-degree angles or bends.

To further describe the present technology, examples are now provided with reference to the figures.

Figure 4:
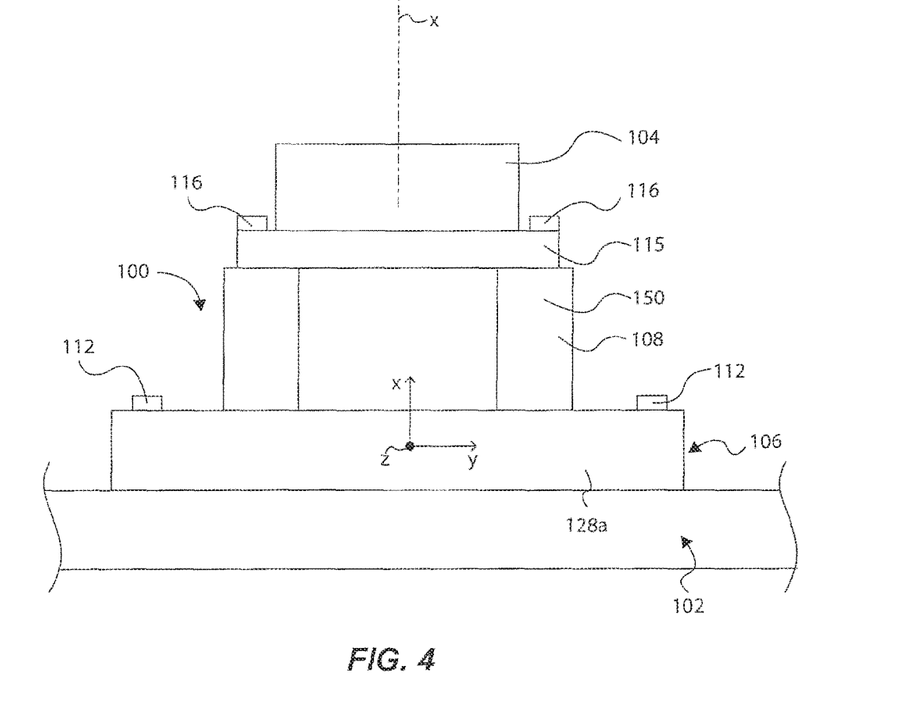
FIG. 4 is a left side view of the isolator device of FIG. 1 coupled to an input structure and an object to be isolated.

FIGS. 1-4 illustrate various views and aspects of an isolator device 100 for attenuation of shock and/or vibration energy transferrable from an input structure 102 to an object 104 (see e.g., FIG. 4). At the outset the input structure 102 can be any structure, vehicle, body, or other device that can generate or transfer or exhibit or experience shock and/or vibration energy, such as a missile body. The object 104 to be isolated can be any device, component, or other object to be isolated from the shock and/or vibration energy, such as a gyroscope suspending a sensitive electronics device supported by the missile body. This is not meant to be limiting, as it will be appreciated from the present disclosure that the isolator devices exemplified herein can be utilized in a variety of other applications that can benefit from a tuned isolator device. For example, example isolator devices can be used for isolating shock and/or vibration energy in surveillance cameras, MEMS sensors, oscillators, avionic sensors and components and others as will be recognized by those skilled in the art.

As will be further detailed below, the isolator device 100 can be designed and tuned to particular resonant frequencies in each of the three principal axes to accommodate for different vibration profiles, namely, an axial direction (x-axis), a first radial direction (y-axis), and a second radial direction (z-axis).

Figure 1:
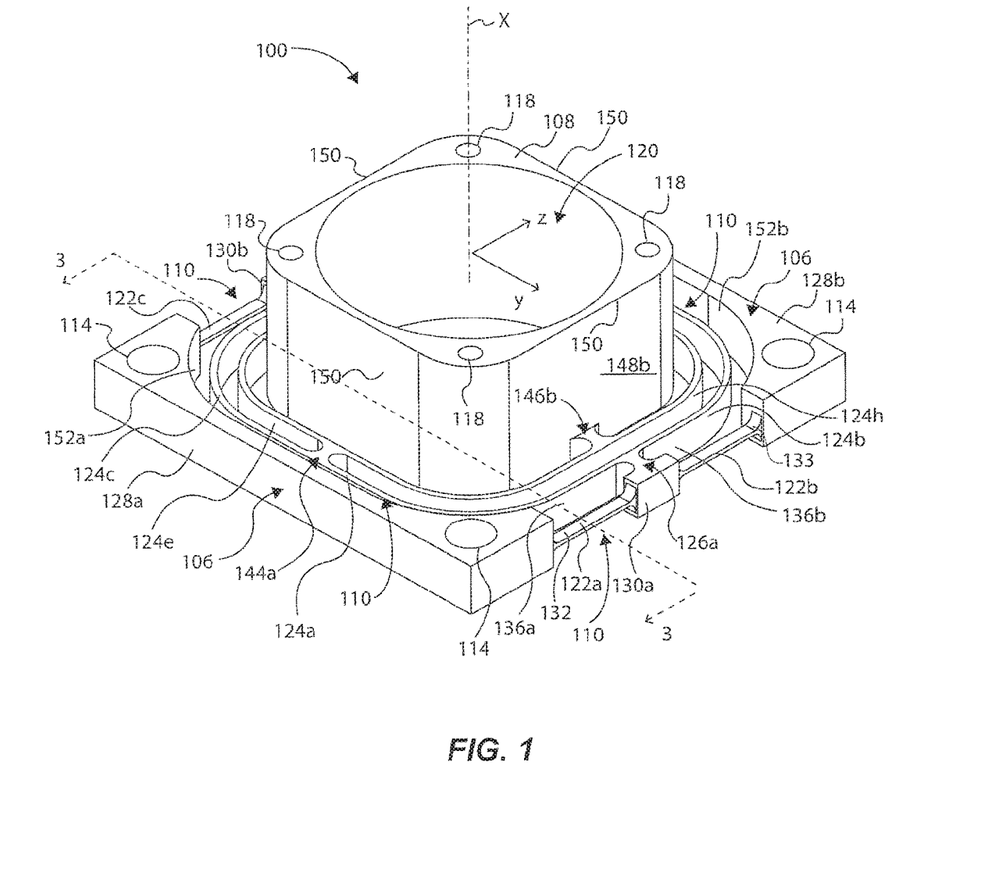
FIG. 1 is an isometric view of an isolator device in accordance with an example of the present disclosure.

In one example, the isolator device 100 comprises a first mount 106, a second mount 108, and a flexure structure 110 coupled between the first and second mounts 106 and 108, respectively, at least a portion of the flexure structure 110 being coupled to each of the first and second mounts 106 and 108. The first mount 106 can be coupled to the input structure 102 (FIG. 4) in a variety of ways using a variety of methods. In the example shown, the first mount 106 is coupled to the input structure 102 via four fasteners 112 disposed through four perimeter apertures 114 formed through the first mount 106 (FIG. 1). Regarding a profile of the first mount 106, an outer perimeter defined by the outer sides of the first mount 106 can be generally square shaped to accommodate a symmetrical isolator device 100, as further detailed below. However, this is not intended to be limiting in any way as other shapes or configurations are contemplated. Furthermore, as shown, the perimeter apertures 114 can be formed an equidistance from each other to accommodate a more uniform attenuation of shock and/or vibration energy from the input structure 102 about the flexure structure 110. However, the first mount 106 can take other forms and can comprise other profiles, and can be attached to an input structure through various other suitable means.

The second mount 108 can be coupled to a mount plate 115 (FIG. 4) of the object 104 using one or more fastening or coupling members. In the example shown, the fastening members can comprise, and the second mount 108 can be coupled to the mount plate 115 via, four fasteners 116 disposed through four perimeter apertures 118 (FIG. 1) formed through respective corners of the second mount 108. The second mount 108 can comprise a central opening 120 that, in some examples, can be generally cylindrical to receive a corresponding cylindrical portion of the object 104

(e.g., a two-axis gyroscope). The central opening 120 of the second mount 108 can define a central and normal axis X, which can be substantially collinear with a central axis of the first mount 106. In some examples, the central opening 120 can be concentric with certain portions of the flexure structure 110 and with the first mount 106, as will be appreciated from the below discussion, and the figures. However, the central opening 120 need not be concentric, and can instead be off-center while still achieving a desired damping or attenuation effect.

The isolator device 100 is configured to isolate the object 104 from direct contact with the input structure 102, so that any shock and/or vibration loads in the input structure 102 travel through the isolator device 100 (and through the flexure structure 110) before reaching the object 104, wherein the isolator device 100 functions to reduce and dissipate the energy of the shock and/or vibration loads. Thus, the flexure structure 110 provides an isolation path (or paths) for shock and/or vibration energy to travel between the first mount 106 and the second mount 108. As further detailed below, this isolation path (as defined by the flexure structure 110) can include a series of parallel flexures 122a-d and a series of radial flexures 124a-h that include or define a plurality of transition portions (e.g., transition portions 126a, 126b, 144a, 144b, 146a, and 146b, each defining ninety-degree bends as discussed below). Because of the patterning and design of the flexure structure 110, the isolation path between the first and second mounts 106 and 108 is much longer than the straight-line distance between them. Thus, shock and/or vibration energies are attenuated due to the plurality of transition portions and the tortuous, elongated path provided by the particular configuration of the flexure structure 110.

Figure 2:
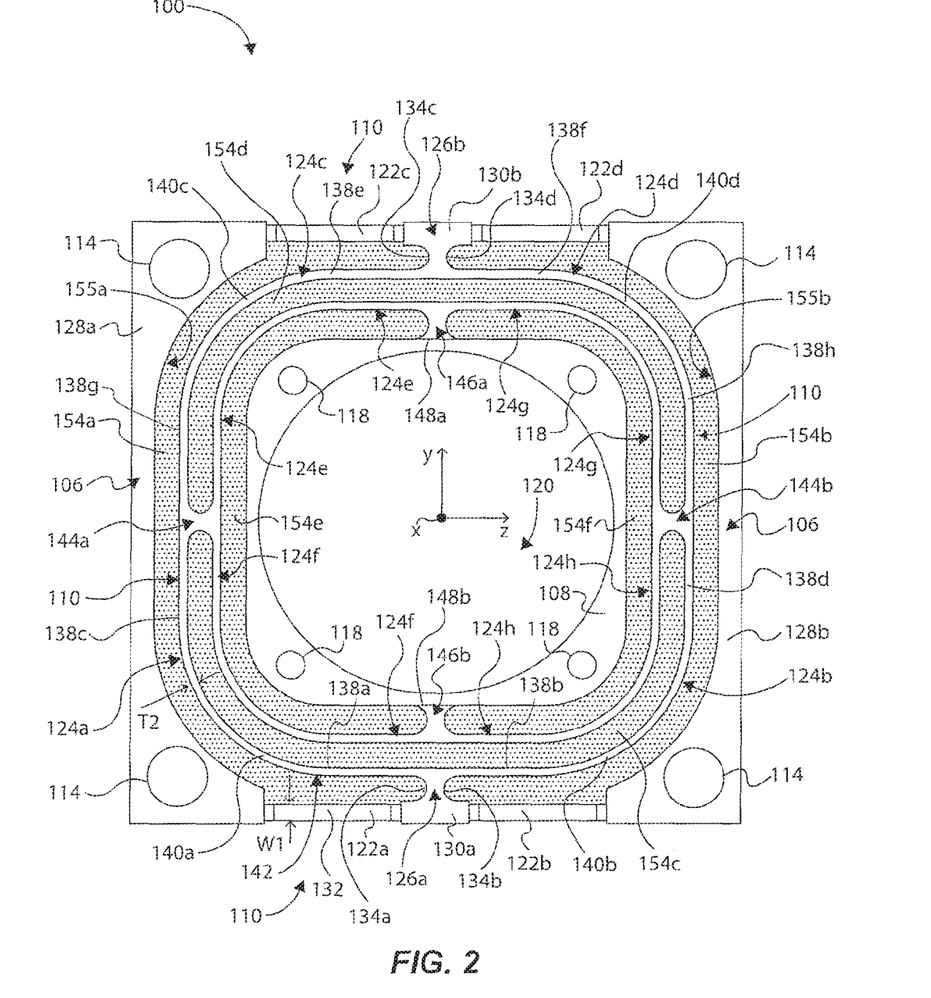
FIG. 2 is a top down view of the isolator device of FIG. 1.
Figure 3:
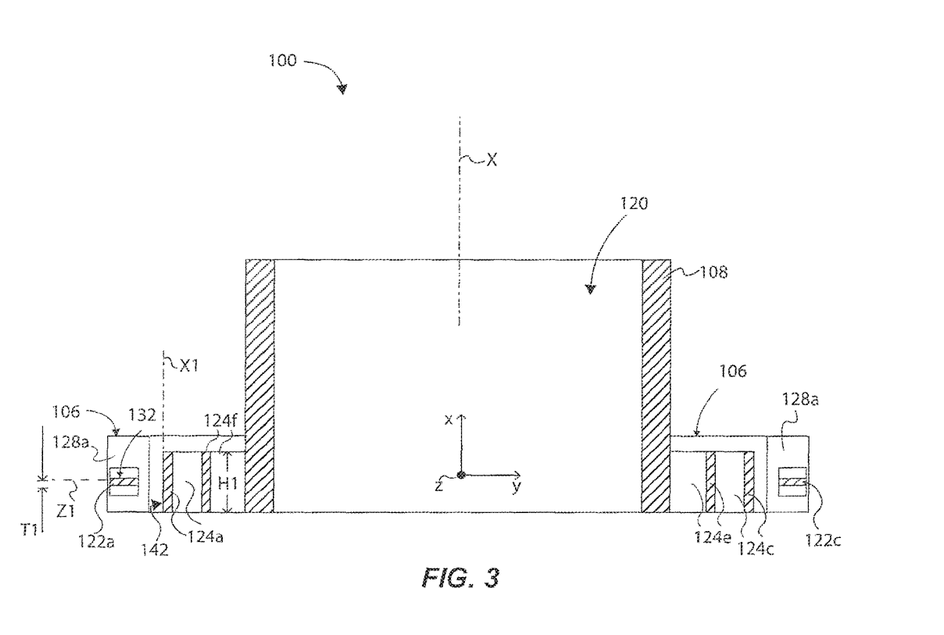
FIG. 3 is a cross-sectional view of the isolator device of FIG. 1, taken along lines 3-3.

More specifically, the flexure structure 110 can comprise a first pair of parallel flexures 122a and 122b, and a second pair of parallel flexures 122c and 122d. The first and second pairs of parallel flexures 122a-b and 122c-d are formed or tuned, and are oriented and supported, to attenuate shock and/or vibration in an axial direction X1 that is generally parallel to the normal axis X. More particularly, the first mount 106 can comprise opposing first and second mount bodies 128a and 128b that can be formed to be substantially identical to each other and symmetrical along the z-axis and also along the y-axis (FIG. 2). In this configuration or arrangement, the first pair of parallel flexures 122a and 122b can facilitate connection of the first mount body 128a to the second mount body 128b on one side of the isolator device 100, and the second pair of parallel flexures 122c and 122d can facilitate connection of the first mount body 128a to the second mount body 128b on the other side of the isolator device 100. Therefore, the isolator device 100 can be generally symmetrical about the z-axis regarding the configuration of the parallel flexures 122a-d and the first and second mound bodies 128a and 128b. Such symmetrical configuration provides uniform attenuation of shock and/or vibration energy about the normal axis X in the axial direction.

As best shown in FIG. 2, the parallel flexures 122a and 122c each extend inwardly from end portions of the first mount body 128a, and along the z-axis. The parallel flexures 122a and 122c each transition into respective first and second flexure mount portions 130a and 130b of the flexure structure 110. The first and second flexure mount portions 130a and 130b can be situated on either side of the isolator device 100, and can have a portion that intersects along the y-axis. Similarly, the parallel flexures 122b and 122d each extend inwardly from end portions of the second mount body 128b, along the z-axis. The parallel flexures 122b and 122d also each transition into the respective first and second flexure mount portions 130a and 130b (on the other sides from where the parallel flexures 122a and 122c transition into the first and second flexure mount portions 130a and 130b.

Each of the parallel flexures 122a-d can be formed to be substantially identical in shape to each other to ensure a uniform attenuation of shock and/or vibration energy in the axial direction along the normal axis X. Each parallel flexure 122a-d can comprise a flexing surface that is oriented to be generally orthogonal to the normal axis X. Thus, as an example shown in FIGS. 1-3, the parallel flexure 122a can comprise a flexing surface 132 that is generally planar and that extends in a plane along an axis Z1 that extends orthogonal to the normal axis X. The flexing surface 132 can have a width W1 (FIG. 2) that is greater than a thickness T1 (FIG. 3) of the parallel flexure 122a. Thus, parallel flexure 122a can be a relatively thin, flat attenuation member with its surface 132 extending orthogonally to the normal axis X. In this manner, the parallel flexure 122a (and the others 122b-d) can slightly flex or vibrate bi-directionally in the axial direction along the normal axis X due to the above described shape and cross sectional area and mounting orientation of each parallel flexure formed specifically orthogonal to the normal axis X to attenuate shock and/or vibration axially about the normal axis X.

Because the first and second pairs of parallel flexures 122a-b and 122c-d are situated on either side of the second mount 108, the parallel flexures 122a-d cooperatively operate to uniformly attenuate shock and/or vibration energy in space axially around the second mount 108. In other words, if only one pair of parallel flexures were provided on only one side of the second mount 108, the axial resonant frequency of the isolator device 100 would be off-balanced, thereby posing risk of damage or failure of the object 104.

In some examples, each parallel flexure 122a-d can have curved or rounded transition portions 133 (FIG. 1) formed on either side, and on either end, which transition portions extend away from the flexing surface of each of the respective parallel flexures 122a-d. For example, parallel flexure 122b is shown as comprising four curved transition portions, two about each end (e.g., see curved transition portion 133 extending upward from its flexing surface), These curved or rounded transition portions (e.g., 133) are formed between respective mount bodies 128a and 128b, and respective first and second flexure mount portions 130a and 130b (see also FIG. 2). These curved or rounded transition portions can help to maximize the structural integrity of the isolator device 100 (as opposed to having square or perpendicular transition portions), while also ensuring a smooth transition path of shock and/or vibrational energy from the first mount 106 through the parallel flexures 122a-d and to the first and second flexure mount portions 130a and 130b.

The isolation path extends through the plurality of parallel flexures 122a-d, and then through to the series of radial flexures 124a-h, so that the parallel flexures are formed in series with the series of radial flexures. The series of radial flexures 124a-h begin at positions inwardly (toward the normal axis X) from the respective first and second flexure mount portions 130a and 130b, and then the series of radial flexures 124a-h (and the transition portions) traverse around the second mount 108 to further define the isolation path. The isolation path ends essentially at the second mount 108, where the series of radial flexures 124a-h transition into, and are coupled to, the second mount 108.

More specifically, from the first flexure mount portion 130a, a primary transition portion 126a extends inwardly and comprises opposing curved transition portions 134a and 134b (FIG. 2) that transition approximately 180 degrees into respective radial flexures 124a and 124b (to the left and to the right, as seen best in FIG. 2). Radial flexures 124a and 124b can comprise respective linear portions 138a and 138b that transition into respective contoured portions 140a and 140b, that each transition into respective linear portions 138c and 138d. Taking radial flexure 124a as an example, the linear portion 138a of radial flexure 124a extends in a different direction (i.e., 138a extends along the z-axis) than the linear portion 138c (i.e., 138c extends along the y-axis) as the linear portions 138a and 138c are separated by the contoured portion 140a that changes the path direction in the radial flexure 124a between the two linear portions 138a and 138c. In some examples, the contoured portion 140a is curvilinear and has a given Radius as extending between adjacent linear portions 138a and 138c. Thus, each radial flexure 124a and 124b generally turn about a ninety-degree bend, relative to the normal axis X, about the respective contoured portions 140a and 140b (as is similarly the case with the other radial flexures). This curved or contoured profile portions (e.g., 140a) of each radial flexure (124a-h) provides further attenuation of shock and/or energy due to its bend and associated change in direction and the length of travel along the isolation path through the radial flexures, as further discussed below regarding the series of flexures.

Notably, each radial flexure can comprise a flexing surface extending along a plane that is parallel to the normal axis X. For instance, radial flexure 124a can comprise a flexing surface 142 that extends along a plane X1 that is parallel to the normal axis X. Therefore, the radial flexure 124a can have a height H1 defined along the flexing surface 142, and can have a thickness T2 that is less than the height H1. Thus, the cross-sectional area of the radial flexure 124a can be generally rectangular, and, similarly to the parallel flexures, the radial flexure 124a can be a relatively thin, strip or panel or beam of material that resonates radially outwardly relative to the normal axis X because of the particular shape and orientation of the radial flexure 124a as exemplified herein. The same holds true for the other radial flexures, as discussed below, namely that each radial flexure has the same or similar cross-sectional area.

Similarly, the second flexure mount portion 130b comprises a primary transition portion 126b that extends inwardly, and comprises opposing curved transition portions 134c and 134d that transition approximately 180 degrees into respective radial flexures 124c and 124d (to the left and to the right into radial flexures 124c and 124d, as in FIG. 2). Radial flexures 124c and 124d can comprise respective linear portions 138e and 138f that transition into respective contoured portions 140c and 140d, that transition into respective linear portions 138g and 138h. Thus, each radial flexure 124c and 124d generally turns about a ninety-degree bend, relative to the normal axis X, due to respective contoured portions 140c and 140d, in a similar manner as radial flexures 124a and 124b.

Radial flexures 124a and 124c transition into (or meet at) an intermediate transition portion 144a that is formed an equidistance from the primary transition portions 126a and 126b, and that is formed to have a portion that intersects with the z-axis, or in other words, is located at a midpoint of the mount body 128a. Thus, linear portions 138c and 138g transition to the intermediate transition portion 144a. Intermediate transition portion 144a includes curved portions (not labeled, but similar to curved portion 134a and 134b) that transition into respective radial flexures 124e and 124f that extend in opposite directions from the intermediate transition portion 144a. Intermediate transition portion 144a further defines ninety-degree bends (in either direction), thus further convoluting the isolation path.

Similarly, on the other side of the flexure structure 110 from intermediate transition portion 144a (at a midpoint of mount body 128b), radial flexures 124b and 124d transition into (or meet at) an intermediate transition portion 144b that is formed an equidistance from the primary transition portions 126a and 126b. Thus, linear portions 138d and 138h transition into the intermediate transition portion 144b, which can include curved portions (not labeled) that transition to radial flexures 124g and 124h extending in opposite directions from the intermediate transition portion 144b. Notably, the intermediate transition portion 144b comprises two ninety-degree bends in the isolation path to further define changes in direction of the isolation path to again attenuate shock and/or vibration energy about the isolation path. As such, the intermediate transition portions 144a and 144b are generally symmetrical relative to each other about the y-axis, which contributes to a uniform attenuation of shock and/or energy radially in both the x and y axes.

The radial flexures 124e-h can each have the same or similar configuration or profile (i.e., height, thickness, linear portions, contoured portions), and can be similarly oriented, as the radial flexures 124a and 124c discussed above, such that they flex in a radial direction relative to the X axis. Moreover, it will be appreciated that the radial flexures 124a-h can be oriented to be generally parallel to each other relative to the normal axis X.

Following the isolation path from the intermediate transition portions 144a and 144b toward the second mount 108, radial flexures 124e and 124g transition into a secondary transition portion 146a, which then transitions into a first (upper) side 148a of the second mount 108. On the other side of the second mount 108, radial flexures 124f and 124h transition into an opposing secondary transition portion 146b, which transitions into a second (lower) side 148b of the second mount 108. Each of the secondary transition portions 146a and 146b can have curved or rounded portions that extend between linear portions of the respective radial flexures, and then that curve into respective first and second sides 148a and 148b of the second mount 108 (and formed similarly as the other transition portions). Thus, as shown in FIG. 2, the series of radial flexures 124e-h, and the secondary transition portions 146a and 146b, are symmetrical about the z-axis, which promotes a uniform attenuation of shock and/or vibration isolation characteristics radially about both the y-axis and the z-axis.

Thus, in broader terms of attenuation of shock and/or vibration in two radial directions (y, z) relative to the normal axis X, the isolation path can extend and bend a number of different directions through the flexure structure 110. In one example, as is best viewed in FIG. 2, the isolation path can extend equally and uniformly through each of the primary transition portions 126a and 126b, and can then bend or turn laterally approximately ninety-degrees into respective radial flexures 124a-d, wherein the path bends or turns approximately ninety-degrees again through respective contoured portions 140a-d, The isolation path can then bend or turn approximately ninety-degrees into respective intermediate transition portions 144a and 144b, and then bend or turn approximately ninety-degrees into respective radial flexures 124e-h, wherein the path bends or turns approximately ninety-degrees through respective contoured portions (similar to contoured portions 140a-d). Finally, the isolation path can bend or turn approximately ninety-degrees into respective secondary transition portions 146a and 146b (which are coupled to opposing sides of the second mount 108).

Thus, the entire isolation device 100 can define an isolation path that can comprise a series or a plurality of directional changes (in the example shown, at least twelve ninety-degree bends), in radial directions relative to the normal axis X, between the first mount 106 and the second mount 108. It is contemplated that different isolation devices can comprise different configurations, and therefore a different number of directional changes in the isolation path. As such, the example shown is not meant to be limiting, as a particular isolation device could have more or less than twelve directional changes or bends and still achieve attenuation in both radial directions (y, z) relative to the normal axis X.

Notably, the profile of each of the radial flexures 124a-h can be substantially similar in shape and size, as defined between respective adjacent transition portions. And, each laterally adjacent radial flexure can be spaced apart from any other radial flexure to define a series of gaps or openings. The width of the defined gaps between the different radial flexures can be the same or different. In the example shown, the width of the gaps between the radial flexures is the same. Such similarities in dimensions can promote or provide a uniform attenuation of isolation of shock and/or vibration energy in both radial directions (y, z) relative to the normal axis X, so that the isolator device 100 can isolate the object 104 from energy transferred by the input structure 102.

Therefore, during use or operation, the parallel flexures 122a-c operate to attenuate shock and/or vibration energy about an axial direction (x-axis) relative to the normal axis X, while the series of radial flexures 124a-h operate to attenuate shock and/or vibration energy about a first radial direction (y-axis) relative to the normal axis X, and also a second radial direction (z-axis), therefore attenuating shock and/or vibration about all three principle axes. As detailed above, this is because of the particular configuration of the flexure structure 110, namely the shape and orientation of the parallel flexures, and the shape and orientation of the radial flexures and transition portions.

Furthermore, each of the radial flexures 124a-h cooperate to generally surround or circumscribe a portion of the second mount 108, while being at least partially surrounded or circumscribed by the confines or perimeter of the first mount 106. In some examples, the entire isolation device 100 is symmetrical along the y-axis and along the z-axis, which assists to promote uniform attenuation of shock and/or vibration energy in all three principle axes, as also discussed above.

In the illustrated example of FIGS. 1 and 2, an outer perimeter 150 of the second mount 108 can have a profile of a "squircle", which is a mathematical shape intermediate between a square and a circle, sometimes also referred to as a rounded square. Accordingly, isolation paths of the series of radial flexures 124a-h around the second mount 108 can also define or have a profile of a rounded square (e.g., the path of the radial flexures 124a-d around the entirety of the second mount 108). Similarly, inner surfaces 152a and 152b of the first and second mount bodies 128a and 128b can collectively at least partially define a rounded square that surrounds the rounded square profile of the radial flexures 124a-h and of the second mount 108. Said another way, the series of radial flexures 124a-h can be laterally nested (along the y and z axes) within or between the first mount 106 and the second mount 108.

In some examples, the series of radial flexures 124a-h at least partially define a plurality of slots or openings 154a-f positioned or situated or formed between the first and second mounts 106 and 108. More specifically, the openings 154a-f are formed in parallel and series with each other as defined from the first mount 106 to the second mount 108. The openings 154a-f are defined in a manner to have generally the same lateral width or profile relative to the normal axis X. Thus, the profiles of the first mount 106 (i.e., the inner surfaces 155a and 155b) can be generally congruent, and can correspond, to the profiles of the radial flexures 124a-d, so that the respective openings 154a and 154b between the first mount 106 and the series of radial flexures 124a-d are substantially similar, Thus, the openings 154a and 154b can be generally symmetrical relative to each other about the y-axis, as best shown in FIG. 2. Similarly, inwardly from openings 154a and 154b, the adjacent openings 154c and 154d are defined between respective radial flexures 124a-d and radial flexures 124e-h. Such openings 154c and 154d can be substantially similar, and can be symmetrical relative to each other about the z-axis. Finally, inwardly from openings 154c and 154d, the adjacent openings 154e and 154f are defined between respective radial flexures 124e-h and the perimeter surface 150 of the second mount 108. Such openings 154e and 154f can be substantially similar, and are therefore symmetrical relative to each other about the y-axis. Thus, each set of openings (i.e., a set being those openings between the same two structures, such as openings 154a and 154b, and so on) are equally spaced apart from one another other about the series of radial flexures 124a-h. Such equal spacing assists to ensure uniform attenuation of shock and/or vibration energy about both radial directions (y, z) relative to the normal plane X.

In some examples, an elastomeric damping material 156 can be disposed or deposited within the plurality of openings 154a-f to further dampen or attenuate the shock and/or vibration energy (along with the shape and configuration of the flexure structure 110). Thus, at least some elastomeric damping material 156 can be disposed along the various flexing surfaces (e.g., 142) of the series of radial flexures 124a-h. In some examples, the elastomeric damping material 156 can comprise a silicone rubber material, although other elastomeric materials can be used. The inclusion of the elastomeric damping material 156 can further increase the ultimate resonant frequency of the isolator device 100, while reducing the dynamic response of the isolator device 100 at its resonant frequencies (in each of the three principle axes). This is generally because of the natural damping characteristics of elastomeric materials, and because the elastomeric damping material directly couples any one of the radial flexures to an adjacently situated radial flexure or either one of the first or second mounts 106, 108 (e.g., radial flexure 124a is directly, laterally coupled to radial flexure 124f and to first mount body 128a via the elastomeric damping material 154a deposited there between.

The lateral width of each opening 154a-f can be varied to achieve more or less damping or attenuation of shock and/or vibration energy, because the more elastomeric damping material disposed in the openings, the greater the damping effect of the elastomeric damping material. As such, this can further facilitate tuning of the isolator device 100. Once the type and volume of elastomeric damping material is determined based on a desired resonant frequency of the isolator device 100 (discussed below), the elastomeric damping material can be flowed or deposited in liquid form into the plurality of openings 154a-f, and then allowed to cure at room temperature, in one example. Other suitable depositing and curing means can be employed.

Notably, the isolator device 100 can be entirely formed as, or from, a unitary or single piece of metallic material. For instance, a block of steel or aluminum can be provided, for instance, and a CNC machine can be programmed and operated to machine the isolator device 100 from the single piece or block of metallic material. Waterjet machining techniques can alternatively be utilized. Alternatively, a molten metal can be poured into a form that replicates a designed configuration of a particular isolator device. Forming a particular isolator device from one piece of metallic material (or molding it to become one piece of material) can ensure or maximize structural integrity of the device, because it would be devoid of fasteners or multiple component parts otherwise fastened or coupled together. Moreover, a single piece of metallic material tends to exhibit or promote uniform transfer of vibrational energy through the various portions of the isolator device 100, because such energy may transfer between portions in a uniform manner, which could otherwise not occur if such portions were fastened together with fasteners or other coupling devices because energy could be lost or unbalanced when transferring through such coupled portions. Nonetheless, an isolator device comprising a plurality of component parts fastened or otherwise coupled together is contemplated herein. As such, an isolator device 100 formed from a single piece of material is not intended to be limiting in any way.

The resonant frequency of the isolator device 100 can be tuned or determined by the configuration of the flexure structure, and also by the type and volume of the elastomeric damping material (in examples where such material is used). More specifically, if a particular resonant frequency is desired at which a particular isolator device resonates, a variety of factors or variables can be taken into consideration and manipulated to determine the configuration and the form and makeup of the particular isolator device to arrive at, or close to, resonant frequency for the isolator device to attenuate shock and/or vibration energy appropriately, and in all three principle axes. For instance, one variable is the length of the isolation path along the flexure structure 110, and another variable is the number of ninety-degree turns formed and defined by the flexure structure 110. Other variables include the length, width, and thickness of each of the parallel flexures (e.g., 122a-d), and even the number of parallel flexures to be incorporated into the flexure structure 110 (e.g., two, four, six, etc.).

Other variables taken into consideration to arrive at a particular resonant frequency include the shape, orientation, and configuration of the radial flexures 124a-h. For instance, this includes the particular width, length, height, and thickness of each radial flexure (which can be different for each radial flexure, in some examples). Moreover, the number of radial flexures is another variable to be chosen when performing calculations to arrive at a particular resonant frequency, which is also dependent on the number of bends or turns about the isolation path. For instance, the example of FIGS. 1 and 2 comprises eight total radial flexures 124a-h, but more or less than eight could be incorporated.

Figure 5:
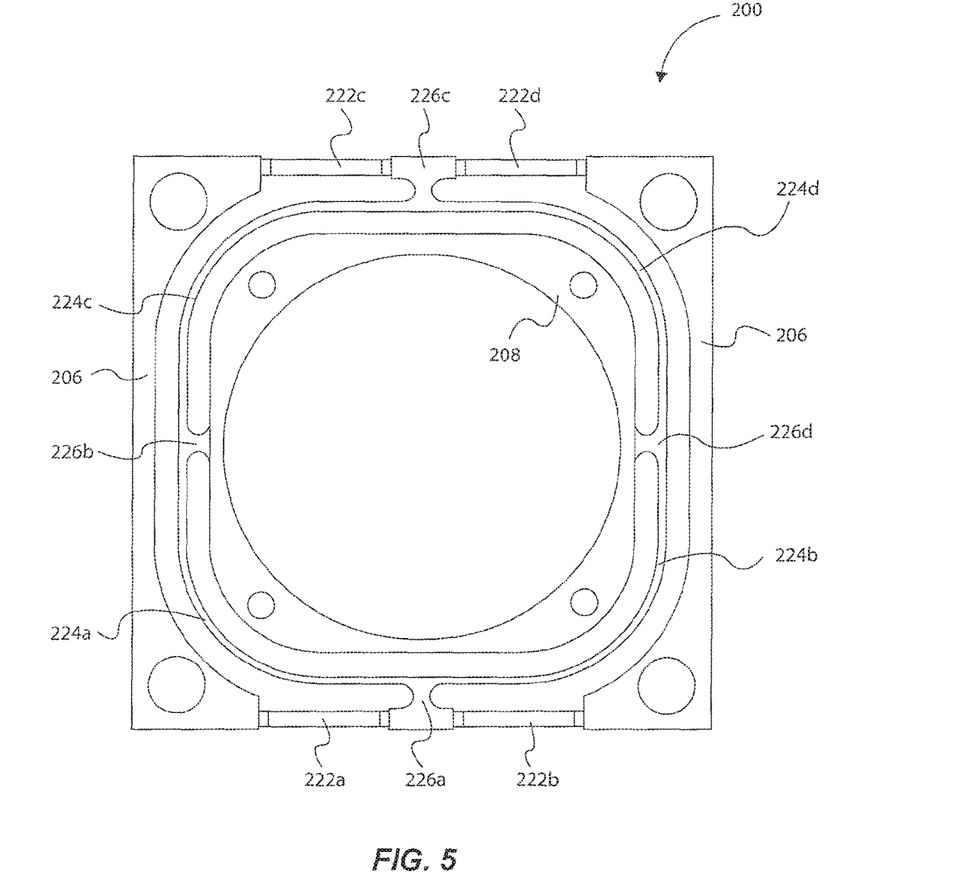
FIG. 5 is a top down view of an isolator device in accordance with an example of the present disclosure.

For example, FIG. 5 shows an isolator device 200, having first and second mounts 206 and 208, and comprising just four radial flexures 224a-d, and having a plurality of parallel flexures 222a-d and a plurality of transition portions 226a-d (similar to isolator device 100). Of course, using less radial flexures can reduce the number of transition portions and isolation path direction changes (e.g., ninety-degree turns) about a particular isolation path, so such variables can be taken into consideration when determining the particular configuration of an isolation device to operate at a desired resonant frequency. Note that the isolator device of FIG. 5 can have the same or similar features as those discussed above regarding the example of FIGS. 1-4.

The type of metallic material can also comprise a variable when performing calculations to arrive at a particular resonant frequency, because different metals and metallic alloys will resonate at different frequencies when having the same exact shape. For instance, the isolator devices exemplified herein can be made from stainless steel that is ductile and that has a relatively high fatigue strength to withstand any stress caused by flexure when the isolator device is subject to repetitive shock and/or vibration loads. Other metals can be selected, such as titanium, aluminum, beryllium, copper, which all have a different modulus of elasticity that can be selected to tune the isolator device to a particular resonant frequency. Other materials such as composites may also be used without departing from the present disclosure. However, generally metals are more stable over time than elastomeric isolators of the prior art. Metals (and other materials such as composites) typically have mechanical properties that do not change over time, and therefore alignments and other dynamic characteristics of a metal or composite isolator device should stay the same from the time it is formed to the time of actual usage in a system, and for many uses thereafter without the risk of degradation or failure, like an elastomeric isolator.

In one example, CAD software can be utilized in an iterative process performing finite element analysis to predict or estimate the resonant frequencies of a particular isolator device. For instance, cross sectional areas of radial flexures can be modified in such software program until a particular resonant frequency is optimized or achieved, as well as the length and number of the radial flexures. The same holds true for the parallel flexures when determining a particular axial resonant frequency. Thus, the flexure structure (e.g., 110) can be tuned to achieve specific and unique frequencies for different axes (x, y, z) of shock and/or vibration attenuation.

Figure 6A:
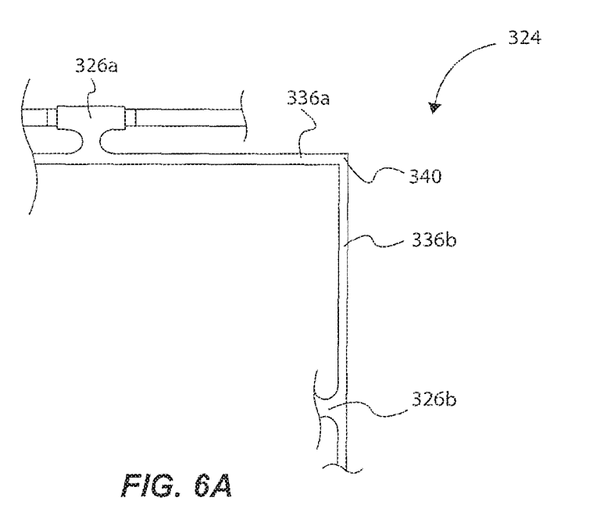
FIG. 6A is a top down view of a portion of an isolator device in accordance with an example of the present disclosure.

FIG. 6A shows an example of a radial flexure 324 having a different profile than any of the radial flexures in the flexure structure 110 shown in FIGS. 1-4. For instance, the radial flexure 324 extends between a first transition portion 326a and a second transition portion 326b, and comprises a first linear portion 336a and a second linear portion 336b extending in different directions. The first and second linear portions 336a and 336b are orthogonal to one another and intersect at corner 340, and define approximately a ninety-degree right angle. Such radial flexure 324 can be part of a series of flexures that surround a square shaped second mount, and that are surrounded by a square shaped first mount (similar to the first and second mounts 106, 108 discussed above and as shown in FIGS. 1-4, but in a square configuration instead of a rounded square configuration).

Figure 6B:
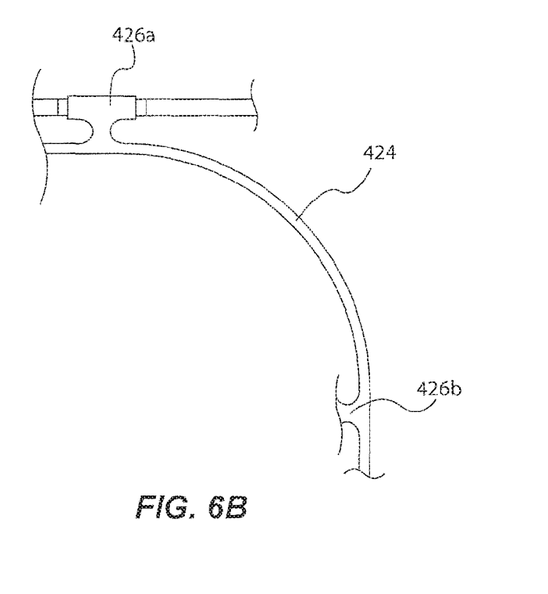
FIG. 6B is a top down view of a portion of an isolator device in accordance with an example of the present disclosure.

FIG. 6B shows another example of a radial flexure 424 that extends between a first transition portion 426a and a second transition portion 426b, and that comprises a curvilinear profile there between, which generally defines approximately a ninety-degree transition or change in direction between the first and second transition portions 426a and 426b. Accordingly, such radial flexure 424 can be part of a series of flexures that surround a circular or substantially circle shaped second mount, and that are surrounded by a circular or substantially circular shaped first mount (similar to the first and second mounts 106, 108 discussed above and as shown in FIGS. 1-4, but in a circular or substantially circular configuration instead of a rounded square configuration).

A combination of the profiles of FIGS. 6A and 6B can be used to form a particular radial flexure, or a combination of other shapes and configurations, namely radial flexures having linear portions, curved portions, right-angle portions, wavy portions, and/or any combination thereof. On this note, the thickness of a particular radial flexure (and parallel flexure) can have a varying cross-sectional area, and some portions of such area can be comprised of softer or harder metallic material, for example. For the avoidance of doubt, the term "radial" flexure does not mean that it necessarily has a radial portion; rather, it is in relation to the "radial" direction of attenuation relative to normal plane X.

Figure 7A:
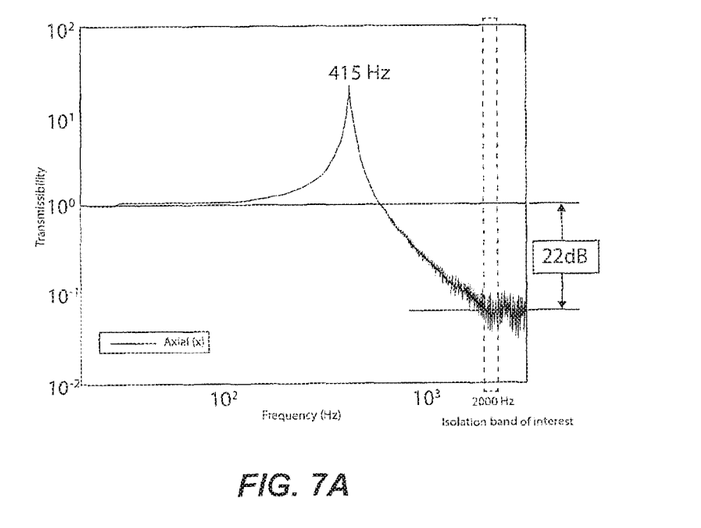
FIG. 7A is a graph illustrating attenuation performance results of an isolator device corresponding to measured axial resonant frequency (x-axis) of an isolator device in accordance with an example of the present disclosure.
Figure 7B:
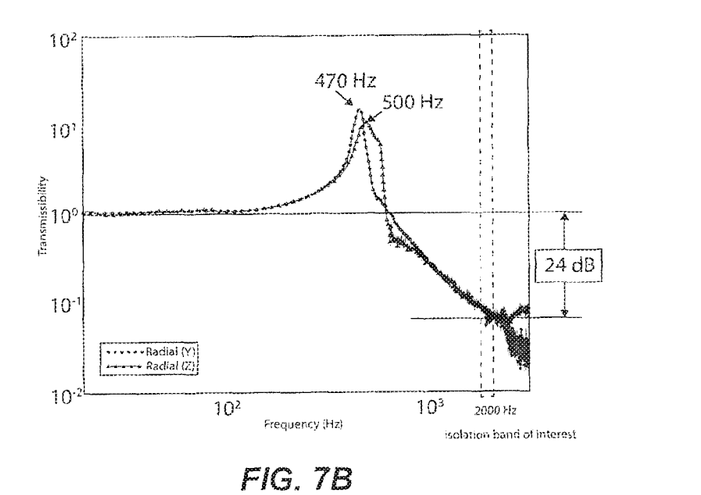
FIG. 7B is a graph illustrating attenuation performance results of an isolator device corresponding to measured radial resonant frequencies (y and z axes) of an isolator device in accordance with an example of the present disclosure.

As a non-limiting example and with reference to FIGS. 7A and 7B, assume a target axial resonant frequency (about the x-axis) is 400 Hz, while a target radial resonant frequency (about both y and z-axes) is 480 Hz. Continuing with the example isolator device 100 of FIGS. 1-4, the measured axial resonant frequency can be 415 Hz (compared to the target of 400 Hz), and the radial resonant frequencies can be 470 and 500 Hz (compared to target of 480 Hz). Notably, both radial resonant frequencies are nearly the same, which is due to the symmetrical design of portions of the isolator device 100, as detailed above. These results show the isolator device 100 significantly attenuates vibration at the isolation band of interest by at least 20 dB (i.e., 22 dB in the axial direction, and approximately 24 dB in the radial directions).

Notably, if a particular axial resonant frequency is desired, the parallel flexures can be modified or shaped accordingly, and independent of the radial resonant frequencies exhibited by the radial flexures. The same holds true for the radial flexures, namely that some radial flexure portions that extend along the direction of the y-axis, for instance, can be formed thicker or of different material (than z-axis portions) to achieve a particular y-axis radial resonant frequency that may be substantially greater than the z-axis radial resonant frequency, for instance. Thus, the isolator devices exemplified herein can be tuned independently in different directions of measures resonant frequencies, which may be desirable for input structures that exhibit vibration or shock differently in different directions (i.e., in an unbalance manner).

This reduction in vibration input is expected to eliminate gyro suspension failure in the example where the object is a gyro suspending a missile seeker, and the input structure is a housing of a missile. However, such example is not meant to be limiting, as the isolator devices discussed herein can isolate many different objects from many different input structures in various applications. For example, isolating vibration and/or shock for optical camera platform, and protecting sensitive avionics, components, and sensors in satellites from launch shock.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An isolator device, comprising:
   a first mount coupleable to an input structure subject to at least one of shock or vibration energy;
   a second mount coupleable to an object to be isolated, the first and second mounts defining a normal axis of the isolator device; and
   a flexure structure coupled between the first and second mounts, the flexure structure comprising at least one radial flexure defining an isolation path between the first and second mounts; the at least one radial flexure comprising a plurality of transition portions, the at least one radial flexure tuned to a predetermined radial resonant frequency,
   wherein the at least one radial flexure structure is operable to attenuate the at least one of shock or vibration energy transferrable from the input structure in at least one radial direction relative to the normal axis.

2. The isolator device of claim 1, wherein the flexure structure further comprises a series of radial flexures coupled to one another via transition portions; the series of radial flexures at least partially defining the isolation path.

3. The isolator device of claim 2, wherein the isolator device is symmetrical along at least one axis orthogonal to the normal axis.

4. The isolator device of claim 1, wherein each transition portion extends orthogonally from a flexing surface of the at least one radial flexure.

5. The isolator device of claim 1, wherein the radial flexure comprises a flexing surface extending along a plane parallel to the normal axis.

6. The isolator device of claim 1, wherein the at least one radial flexure comprises a flexing surface having a width greater than a width of a non-flexing surface.

7. The isolator device of claim 1, wherein the flexure structure is comprised of a metallic material.

8. The isolator device of claim 1, wherein the flexure structure further comprises a plurality of parallel flexures coupled between the first mount and the at least one radial flexure, the plurality of parallel flexures operable to attenuate at least one of shock or vibration energy in a direction parallel to the normal axis.

9. The isolator device of claim 8, wherein the plurality of parallel flexures comprises a first pair of parallel flexures situated on one lateral side of the second mount, and a second pair of parallel flexures situated on an opposing lateral side of the second mount.

10. The isolator device of claim 8, wherein each of the plurality of parallel flexures comprise a flexing surface extending in a plane orthogonal to the normal axis.

11. The isolator device of claim 1, wherein each transition portion comprises a curved profile portion.

12. The isolator device of claim 1, wherein the at least one radial flexure comprises at least one flexure portion extending in different directions.

13. The isolator device of claim 1, wherein the at least one radial flexure comprises flexure portions formed at bent angles relative to one another.

14. The isolator device of claim 1, wherein the at least one radial flexure circumscribes a perimeter of the second mount, and wherein the first mount circumscribes the at least one radial flexure, whereby the at least one radial flexure structure is operable to attenuate the at least one of shock or vibration energy transferrable from the input structure in two radial directions relative to the normal axis.

15. The isolator device of claim 1, wherein the at least one radial flexure at least partially defines a plurality of openings positioned between the first and second mounts.

16. The isolator device of claim 15, further comprising an elastomeric damping material disposed within the plurality of openings, the elastomeric damping material being operable to further dampen response at the isolator's resonant frequency.

17. The isolator device of claim 16, wherein the elastomeric damping material is disposed along the flexing surfaces of the at least one radial flexure.

18. The isolator device of claim 1, wherein the predetermined radial resonant frequency is determined by the configuration of the flexure structure and the elastomeric damping material.

19. The isolator device of claim 1, wherein the isolator device is entirely formed as a unitary piece of metallic material.

20. A system for isolating a device from a support structure, comprising:
an input structure subjectable to at least one of shock or vibration energy;
an object to be isolated from the at least one of shock or vibration energy from the input structure;
an isolator device isolating the object from the input structure, the isolator device comprising:
a first mount coupled to the input structure;
a second mount coupled to the object, the first and second mounts defining a normal axis of the isolator device; and
a flexure structure coupled between the first and second mounts, the flexure structure comprising at least one radial flexure defining an isolation path between the first and second mounts, the at least one radial flexure comprising a plurality of transition portions, the at least one radial flexure tuned to a predetermined radial resonant frequency,
wherein the radial flexure structure is operable to attenuate the at least one of shock or vibration energy transferrable from the input structure in at least one radial direction relative to the normal axis.

21. The system claim 20, wherein the flexure structure further comprises a series of radial flexures coupled to one another via transition portions, the series of radial flexures defining the isolation path, wherein each transition portion extends orthogonally from a flexing surface of each of the radial flexures, wherein each radial flexure comprises a flexing surface extending along a plane parallel to the normal axis.

22. The system of claim 21, wherein the flexure structure further comprises a plurality of parallel flexures coupled between the first mount and the series of radial flexures, the plurality of parallel flexures operable to attenuate at least one of shock or vibration energy in a direction parallel to the normal axis.

23. The system of claim 22, wherein the plurality of parallel flexures and the series of radial flexures are collectively operable to attenuate at least one of shock or vibration energy in three axes relative to the normal axis.

24. The system claim 20, further comprising an elastomeric damping material disposed within a plurality of openings at least partially defined by the at least one radial flexure, the elastomeric damping material being operable to further dampen response at the isolator's resonant frequency.

25. A method for making an isolator device tuned to a predetermined resonant frequency to isolate an object from an input structure, comprising:
determining a resonant frequency associated with an object to be isolated from at least one of shock or vibration energy from an input structure by an isolator device;
selecting a metallic material that forms the isolator device based on the determined resonant frequency;
forming a first mount coupleable to the input structure, and forming a second mount coupleable to the object, the first and second mounts forming a portion of the isolator device; and
forming at least one radial flexure of a flexure structure of the isolator device between the first and second mounts to form the isolator device, the radial flexure operable to attenuate the at least one of shock or vibration energy transferrable from the input structure.

26. The method of claim 24, further comprising selecting a volume and type of elastomeric damping material based on the determined resonant frequency, and depositing the selected elastomeric damping material about a plurality of openings defined by the at least one radial flexure.

27. The method of claim 24, further comprising forming the flexure structure by forming a series of radial flexures having a plurality of transition portions, and by forming a plurality of parallel flexures between the plurality of radial flexures and the first mount, whereby the series of radial flexures and the plurality of parallel flexures are collectively operable to attenuate at least one of shock or vibration energy in three axes relative to a normal axis of the isolator device.

28. The method of claim 24, further comprising operating a machining tool to form the entire isolator device from a single piece of metallic material.

* * * * *